(12) United States Patent
Sun (10) Patent No.: US 9,790,830 B2
(45) Date of Patent: Oct. 17, 2017

(54) EXHAUST AFTER-TREATMENT SYSTEM INCLUDING ELECTROLYSIS GENERATED H2 AND NH3

(71) Applicant: Tenneco Automotive Operating Company Inc., Lake Forest, IL (US)

(72) Inventor: Yong Sun, Ann Arbor, MI (US)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 7 days.

(21) Appl. No.: 14/972,642

(22) Filed: Dec. 17, 2015

(65) Prior Publication Data

US 2017/0175603 A1    Jun. 22, 2017

(51) Int. Cl.
F01N 3/00 (2006.01)
F01N 3/20 (2006.01)
F01N 3/08 (2006.01)

(52) U.S. Cl.
CPC .......... *F01N 3/208* (2013.01); *F01N 3/0814* (2013.01); *F01N 3/0842* (2013.01); *F01N 3/2073* (2013.01); *F01N 2240/04* (2013.01); *F01N 2610/02* (2013.01); *F01N 2610/1406* (2013.01)

(58) Field of Classification Search
USPC ................. 60/274, 275, 286, 297, 301, 303
See application file for complete search history.

(56) References Cited

U.S. PATENT DOCUMENTS

| | | |
|---|---|---|
| 5,272,871 A | 12/1993 | Oshima et al. |
| 5,809,775 A | 9/1998 | Tarabulski et al. |
| 7,157,166 B2 * | 1/2007 | Vajo ..................... H01M 8/1246 429/504 |
| 7,204,081 B2 | 4/2007 | Yasui et al. |
| 7,418,957 B2 * | 9/2008 | Abe ..................... F02D 41/1494 123/697 |
| 7,803,264 B2 | 9/2010 | Botte |
| 7,954,311 B2 | 6/2011 | Shaikh et al. |
| 8,069,827 B2 | 12/2011 | Watanabe et al. |
| 8,166,926 B2 | 5/2012 | Sasaki et al. |

(Continued)

FOREIGN PATENT DOCUMENTS

| | | |
|---|---|---|
| DE | 4221363 A1 | 1/1993 |
| DE | 19947198 A1 | 4/2001 |

(Continued)

OTHER PUBLICATIONS

C.W. Park et al. "Effect of hydrogen-enriched gas as a reductant on the performance of a lean NOx trap catalyst for a light-duty diesel engine"; May 28, 2010.

*Primary Examiner* — Binh Q Tran
(74) *Attorney, Agent, or Firm* — Harness, Dickey & Pierce, P.L.C.

(57) ABSTRACT

An exhaust after-treatment system including an exhaust passage, a lean-NOx trap (LNT) provided in the exhaust passage, a tank carrying an aqueous reagent, an electrochemical cell in communication with the tank and configured to receive the aqueous reagent therefrom, the electrochemical cell configured to convert the aqueous reagent into a hydrogen exhaust treatment fluid for purging the LNT, and a controller in communication with the electrochemical cell, wherein the controller is configured to vary an amount of the hydrogen exhaust treatment fluid produced by the electrochemical cell.

29 Claims, 8 Drawing Sheets

(56) References Cited

U.S. PATENT DOCUMENTS

| | | | |
|---|---|---|---|
| 8,388,920 B2* | 3/2013 | Botte | C25B 1/00 205/464 |
| 8,491,842 B2 | 7/2013 | Johansen et al. | |
| 8,562,929 B2 | 10/2013 | Botte | |
| 8,740,113 B2 | 6/2014 | Roessle et al. | |
| 8,911,699 B2 | 12/2014 | Colannino et al. | |
| 8,978,364 B2 | 3/2015 | Olivier et al. | |
| 9,057,304 B2 | 6/2015 | Huthwohl | |
| 9,217,347 B2* | 12/2015 | Englert | F01N 3/02 |
| 2009/0095636 A1 | 4/2009 | Botte | |
| 2010/0018476 A1* | 1/2010 | Zemskova | F01N 3/2073 123/3 |
| 2010/0114463 A1 | 5/2010 | Leustek et al. | |
| 2010/0319317 A1 | 12/2010 | Oberski et al. | |
| 2011/0243823 A1* | 10/2011 | Botte | C25B 1/00 423/235 |
| 2011/0302909 A1 | 12/2011 | Botte | |
| 2013/0000729 A1 | 1/2013 | Mokire et al. | |
| 2013/0064744 A1 | 3/2013 | Yacoub | |
| 2013/0115141 A1 | 5/2013 | Han et al. | |
| 2014/0070031 A1 | 3/2014 | Lowry et al. | |
| 2015/0064086 A1 | 3/2015 | Colannino et al. | |

FOREIGN PATENT DOCUMENTS

| | | |
|---|---|---|
| DE | 10047512 A1 | 8/2002 |
| DE | 10359522 A1 | 7/2005 |
| DE | 102014001879 A1 | 8/2015 |
| DE | 102014001880 A1 | 8/2015 |
| DE | 102014019427 A1 | 8/2015 |
| EP | 946254 A1 | 10/1999 |
| EP | 1355721 B1 | 10/2003 |
| EP | 1435458 A1 | 7/2004 |
| EP | 2411636 A1 | 2/2012 |
| EP | 02652279 B1 | 10/2013 |
| EP | 02871340 A1 | 5/2015 |
| KR | 2011-0083944 A | 7/2011 |
| WO | WO-2014070516 A1 | 5/2014 |

* cited by examiner

EXHAUST AFTER-TREATMENT SYSTEM INCLUDING ELECTROLYSIS GENERATED H2 AND NH3

FIELD

The present disclosure relates to an exhaust after-treatment system that includes electrolysis generated hydrogen and ammonia for treatment of an engine exhaust.

BACKGROUND

This section provides background information related to the present disclosure which is not necessarily prior art.

In an attempt to reduce the quantity of $NO_X$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include one or more of a diesel particulate filter (DPF), a selective catalytic reduction (SCR) system (including a urea injector), a hydrocarbon (HC) injector, and a diesel oxidation catalyst (DOC).

Another aftertreatment device that has shown promise in reducing NOx emitted to the atmosphere is a lean NOx trap (LNT). A LNT is a device that traps the NOx (NO and $NO_2$ molecules) in a manner similar to a sponge. Once the LNT is full (like a sponge full of water) no more $NO_x$ can be absorbed. Thus, various schemes have been designed to "purge" or "regenerate" the trap. One scheme used to purge the LNT is the injection of diesel fuel upstream of the LNT. In this regard, the diesel fuel provides hydrocarbons that, under rich conditions, chemically react with the adsorbed NOx to produce water ($H_2O$) and nitrogen ($N_2$) as products of the chemical reaction. The use of diesel fuel as a reactant, however, results in a fuel penalty that is undesirable. It is desirable, therefore, to develop an exhaust aftertreatment system having a LNT that does not utilize diesel fuel as a reactant to purge or regenerate the LNT.

SUMMARY

This section provides a general summary of the disclosure, and is not a comprehensive disclosure of its full scope or all of its features.

The present disclosure provides an exhaust after-treatment system including an exhaust passage, a lean-NOx trap (LNT) provided in the exhaust passage, a tank carrying an aqueous reagent, an electrochemical cell in communication with the tank and configured to receive the aqueous reagent therefrom, the electrochemical cell configured to convert the aqueous reagent into a hydrogen exhaust treatment fluid for purging the LNT, and a controller in communication with the electrochemical cell, wherein the controller is configured to vary an amount of the hydrogen exhaust treatment fluid produced by the electrochemical cell.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
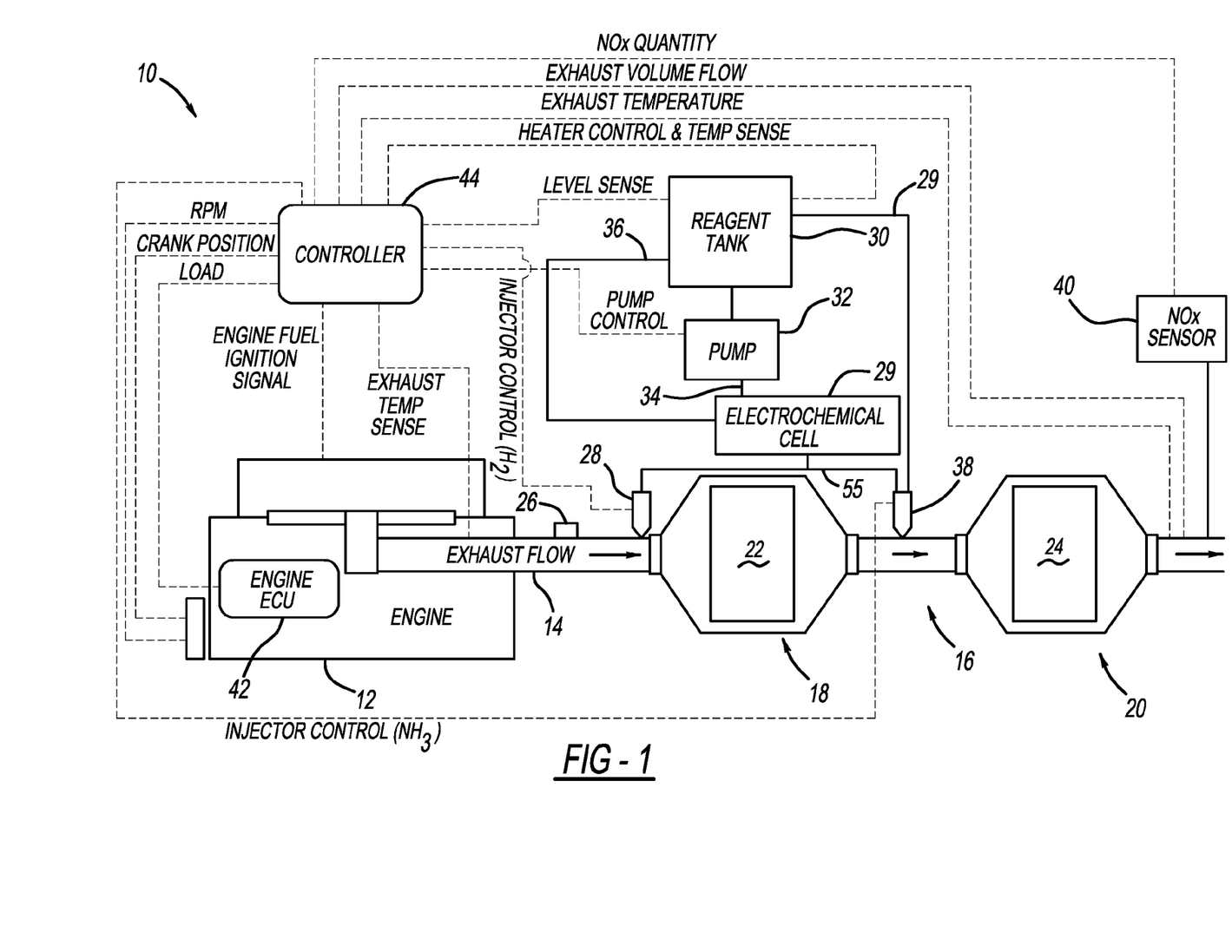
FIG. 1 is a schematic representation of an exhaust after-treatment system according to an exemplary embodiment of the present disclosure.

FIG. 1 schematically illustrates an exemplary exhaust system 10 according to a principle of the present disclosure. Exhaust system 10 can include at least an engine 12 in communication with a fuel source (not shown) that, once consumed, will produce exhaust gases that are discharged into an exhaust passage 14 having an exhaust after-treatment system 16. Engine 12 may be an engine for a vehicle such as a car, truck, locomotive, or marine vessel, or an engine used in a stationary power plant application. Downstream from engine 12 can be disposed a pair of exhaust treatment components 18 and 20, which can include catalyst-coated substrates or filters 22 and 24. In the illustrated embodiment, substrate 22 includes a lean-NOx trap (LNT) component, and substrate 24 includes an SCR component. A LNT is a type of NOx removal system that absorbs NOx under lean exhaust gas conditions, and chemically reduces NOx to water and nitrogen gas under rich conditions.

Although not required by the present disclosure, exhaust after-treatment system 16 can further include components such as a thermal enhancement device or burner 26 to increase a temperature of the exhaust gases passing through exhaust passage 14. Increasing the temperature of the exhaust gas is favorable to achieve light-off of the catalyst (if present) in the exhaust treatment component 18 in cold-weather conditions and upon start-up of engine 12, as well as initiate regeneration of the exhaust treatment component 18 when the exhaust treatment substrate 22 is a LNT.

To assist in reduction of the emissions produced by engine 12, exhaust after-treatment system 16 can include dosing modules or injectors 28 and 38 for periodically dosing a first exhaust treatment fluid and a second exhaust treatment fluid, respectively, into the exhaust stream. As illustrated in FIG. 1, injector 28 can be located upstream of exhaust treatment component 18, and is operable to inject the first exhaust treatment fluid into the exhaust stream that is selected to, for example, purge or regenerate LNT. Injector 38 can be located upstream of exhaust treatment component 20, and is operable to inject the second exhaust treatment fluid to the exhaust stream that is operable to, for example, assist in the selective catalytic reduction of NOx in the exhaust stream.

More specifically, according to the present disclosure, injectors 28 and 38 are in fluid communication with an electrochemical cell 29, with the electrochemical cell 29 receiving an aqueous urea solution from a reagent tank 30 and a pump 32 by way of inlet line 34. Although not required by the present disclosure, electrochemical cell 29 may be in communication with reagent tank 30 via return line 36. Return line 36 allows for any urea solution that does not undergo electrochemical reaction to be returned to reagent tank 30.

As will be described in more detail below, the aqueous urea solution undergoes electrochemical treatment in electrochemical cell 29 to produce ammonia ($NH_3$) and hydrogen ($H_2$). The hydrogen may then then fed to injector 28, which doses the hydrogen into the exhaust passage 14 upstream from LNT 22 to assist with regenerating LNT (i.e., assist in removing the build-up of NOx). The produced ammonia may be fed to injector 38, which doses the ammonia into the exhaust passage 14 upstream of SCR substrate 24 to enhance removal of NOx from the exhaust stream if LNT 22 is full, or if the adsorbed NOx in LNT 22 is not fully reduced to water and nitrogen. Although exhaust system 16 is designed to provide hydrogen and ammonia to injectors 28 and 38, respectively, after passing through electrochemical cell 29, it should be understood that cell 29 may be bypassed such that the aqueous urea solution in reagent tank 30 may be directly provided to injector 38 via injector inlet line 39.

In addition, the activation of downstream catalysts of SCR substrate 24 is enhanced by using the hydrogen to raise exhaust temperatures. In this regard, the use of hydrogen improves light-off and conversion efficiencies for nearly all types of catalysts, which enables greater conversion efficiencies at lower temperatures, enhances cold start and low-load duty cycle response, which are areas of focus for reductions in exhaust emissions.

In addition, it should be understood that the hydrogen produced by cell 29 may be reacted with carbon dioxide for the generation of on-board hydrocarbons, which may then be used in dual fuel applications (i.e., engine applications that include more than a single fuel sources such as a ship or stationary application). Alternatively, the hydrogen may be fed to engine 12 to improve combustion, which reduces emissions while improving fuel efficiency. Additional benefits of hydrogen being fed to engine 12 include resolving engine knock, reduces the amount of NOx generated during combustion, and reduction in in-cylinder particulate matter.

The LNT exhaust treatment substrate 22 may be a monolithic catalyst support that has been coated with a $NO_x$ adsorbing washcoat such as one containing a zeolite. The zeolite acts as an adsorbant that traps the NOx molecules like a molecular sponge. Once the LNT substrate 22 is full, no additional $NO_x$ can be absorbed and the LNT substrate needs to be purged or regenerated by passing a reactant through the LNT substrate 22 to chemically reduce the NOx stored therein to nitrogen and water (e.g., under rich operating conditions). According to the present disclosure, the exhaust after-treatment system 16 includes an electrochemical cell 29 for production of hydrogen through electrolysis of the aqueous urea reagent. The hydrogen produced by electrochemical cell 29 may then be dosed into the exhaust passage 14 as needed at a location upstream of the LNT exhaust treatment substrate 22. In this regard, as will be described in more detail below, the hydrogen produced by electrochemical cell 29 may be stored for use when needed, or the hydrogen may be used as needed immediately after production by the electrochemical cell 29. Regardless, as hydrogen is used to purge or regenerate LNT substrate 22, the fuel penalty that arises through use of diesel fuel as the reactant is avoided because purging or regeneration of the LNT substrate 22 does not require rich operating conditions.

The amount of hydrogen and ammonia produced by electrochemical cell 29 that is required to regenerate LNT substrate 22 and effectively treat the exhaust stream in SCR substrate 24 may vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 40 may be positioned downstream from exhaust treatment component 24. $NO_x$ sensor 40 is operable to output a signal indicative of the exhaust $NO_x$ content to an engine control unit 42. All or some of the engine operating parameters may be supplied from engine control unit 40 via the engine/vehicle databus to a reagent electronic dosing controller 44. The reagent electronic dosing controller 44 could also be included as part of the engine control unit 42. Exhaust gas temperature, exhaust gas flow and exhaust back pressure and other vehicle operating parameters may be measured by respective sensors, as indicated in FIG. 1.

The amount of hydrogen and ammonia required to effectively treat the exhaust stream can also be dependent on the size of the engine 12. In this regard, large-scale diesel engines used in locomotives, marine applications, and stationary applications can have exhaust flow rates that exceed the capacity of the single injectors 28 and 38. Accordingly, although only a single injector 28 is illustrated for dosing hydrogen and only a single injector 38 is illustrated is illustrated for dosing ammonia (or for dosing aqueous urea), it should be understood that multiple injectors 28 and 38 for hydrogen and ammonia injection are contemplated by the present disclosure.

Figure 2:
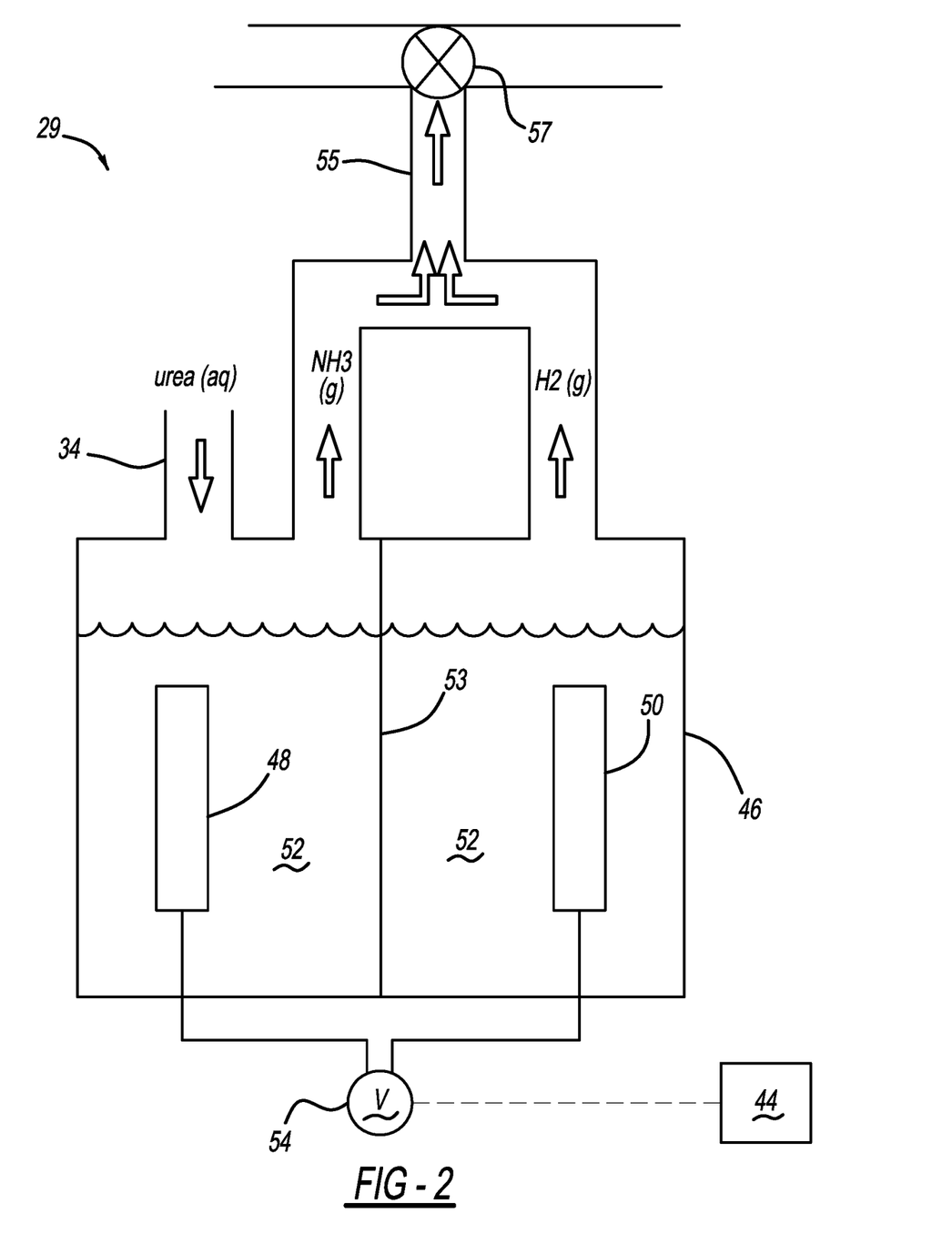
FIG. 2 is a schematic representation of an electrochemical cell that can be used in the exhaust after-treatment systems according to the present disclosure.

An exemplary electrochemical cell 29 is illustrated in FIG. 2. Electrochemical cell 29 may include a reaction chamber 46, which may be made of materials such as steel that are not degraded by the alkaline electrolyte composition held by reaction chamber 46. An anode 48 and a cathode 50 are suspended within an alkaline electrolyte composition 52 contained in chamber 46. A separator 53 is positioned between the anode 48 and the cathode 50 so that the product streams of ammonia and hydrogen produced at each of the anode 48 and cathode 50, respectively, may be separately routed to injectors 28 and 38, respectively. The alkaline electrolyte composition 52 includes an effective amount of aqueous urea received from reagent tank 30. Anode 48 and cathode 50 are electrically connected to a power source 54, such as a voltage source, which provides the electrical energy for the electrolysis of the aqueous urea contained in the alkaline electrolyte composition 52. Although not illustrated, chamber 46 may include a stirring device that intermixes the aqueous urea and alkaline electrolyte composition 52.

The electrodes 48 and 50 can each include a conductor or a support which can be coated with one or more active conducting components. Exemplary conductors include, but are not limited to, metals such as nickel and platinum, alloys such as carbon steel or stainless steel, or other materials capable of conducting electricity such as carbon or graphite. Exemplary electrode support materials may be chosen from many known supports, such as foils, meshes, and sponges, for example. The support materials may include, but are not limited to, Ni foils, Ti foils, graphite, carbon fibers, carbon paper, glassy carbon, carbon nanofibers, and carbon nanotubes. Aside from these specific support materials listed, other suitable supports will be recognized by those of ordinary skill in the art.

The anode 48 may include a conductor that is inert to the alkaline electrolyte composition 52. Additionally, the anode 48 may further include a support material that is inert to the alkaline electrolyte compositions 52 and coated with one or more active conducting components. According to embodiments of the present disclosure, the reaction of urea hydrolysis occurs at the conducting component of the anode 48. Therefore, the conductor and/or the conducting component at the anode 48 include one or more metals active toward electrolytic hydrolysis of urea. Active metals may include cobalt, copper, iridium, iron, platinum, nickel, rhodium, ruthenium, or mixtures or alloys thereof, for example, and in particular, nickel. The active metals may be in an oxidized form, such as nickel oxyhydroxide.

The cathode 50 may include a conductor that is inert to the alkaline electrolyte composition 52. Additionally, the cathode 50 may further include a support material that is inert to the alkaline electrolyte compositions and coated with one or more active conducting components. For example, the conducting component of the cathode may include carbon, cobalt, copper, iridium, iron, nickel, palladium, platinum, rhodium, ruthenium, or mixtures or alloys thereof. Exemplary conducting components include carbon steel and stainless steel.

The structure of the anode 48 and cathode 50 is not limited to any specific shape or form. For example, the active metal may be formed as foil, wire, gauze, bead, or coated onto a support. Alternatively, the anode 48 and cathode 50 may be formed as a series of electrode plates, cylindrical elements, wavy elements, or Swiss roll types of electrodes.

The separator 53 separates the anode 48 from the cathode 50. Separator 53 is generally constructed from materials chemically resistant to the alkaline electrolyte composition 52. Many polymers are suitable for constructing separator 53, including materials such as TEFLON® and polypropylene. Alternatively, separator 53 may be an ion exchange membrane, a solid electrolyte, or an electrolytic gel, for example. Further, the separator 53 may be permeable, semi-permeable or impermeable to gases or liquids.

The electrolyte composition 52 is preferably alkaline. Accordingly, the alkaline electrolyte composition 52 may include a sufficient quantity of any suitable hydroxide salt, carbonate salt, or bicarbonate salt. An alkali metal hydroxide or alkaline earth metal hydroxide salt, such as lithium hydroxide, rubidium hydroxide, cesium hydroxide, barium hydroxide, strontium hydroxide, potassium hydroxide, sodium hydroxide, magnesium hydroxide, calcium hydroxide, and mixtures thereof may also be used. Similarly, alkali metal carbonates or bicarbonate salts or alkaline earth metal carbonates or bicarbonate salts are also suitable electrolytes. The alkaline electrolyte composition 52 may also include a gel, such as a solid polymer electrolyte. Suitable gels include, but are not limited to, those containing polyacrylic acid, polyacrylates, polymethacrylates, polyacrylamides and similar polymers and copolymers.

Voltage source 54 may be any available source, such as a vehicle battery (not shown), vehicle alternator, or fuel cell.

In the case of a stationary application, the voltage source may be power from a grid, or from a renewable energy source such as a solar cell or a wind-turbine generator, for example. Other voltage sources known to those skilled in the art may also be used. Regardless of the source of voltage, a voltage sufficient to initiate the electrolytic hydrolysis of urea is required. Generally, the minimum voltage required to electrolyze or electrolytically hydrolyze urea is about 0.85 volts.

Additionally, according to the present disclosure the rate of producing ammonia and hydrogen from the aqueous urea solution may be controlled by independently varying the voltage to each of the anode 48 and the cathode 50. For example, a first voltage may be applied to the anode 48 to tailor the rate of ammonia production based on the desired amount of SCR required for a particular engine operating condition, and a second voltage may be applied to the cathode to tailor the amount of hydrogen production based on the desired amount of hydrogen required to purge or regenerate LNT 22 or, if the hydrogen is being fed to the engine 12, the amount of hydrogen desired to improve combustion to reduce emissions produced by the engine 12. In this manner, various blends of ammonia and hydrogen can be produced by electrochemical cell 29 that are specifically tailored to various operating conditions of engine 12.

Further, the first and second voltages applied to the anode 48 and cathode 50 by voltage source 54 can be controlled by ECU 42 or controller 44. For example, controller 44 is configured to determine the amount of NOx being produced by engine 12 based on a signal received from NOx sensor 40. Controller 44, therefore, can adjust the first voltage applied to anode 48 by voltage source 54 to either increase or decrease ammonia production by electrochemical cell 29. Alternatively, controller 44 is configured to determine the correct voltage to be applied to each of the anode 48 and cathode 50 based on crank position, engine load, RPM, exhaust volume, exhaust temperature, and the like. In this manner, the amounts of ammonia and hydrogen produced can be independently increased or decreased dynamically.

After the hydrogen and ammonia gases are generated at anode 48 and cathode 50, respectively, the mixture of gases exit electrochemical cell 29 through outlet 55 where the mixture of gases are then routed to either injector 28 or injector 38 and dosed into the exhaust stream. In this regard, outlet 55 includes a valve 57 that can direct the mixture of gases toward injector 28 or to injector 38. Alternatively, valve 57 can be used to split a portion of the gas mixture towards injector 28, and split a portion of the gas mixture towards injector 38. Regardless, as noted above, electrochemical cell 29 can be operated in a manner where various blends of hydrogen and ammonia can be produced. Based on the desired operating conditions of exhaust system 16, the use of valve 57 allows for various blends of the gas mixture to be directed to the desired injector(s) 28 and/or 38 as needed or desired.

Figure 3:
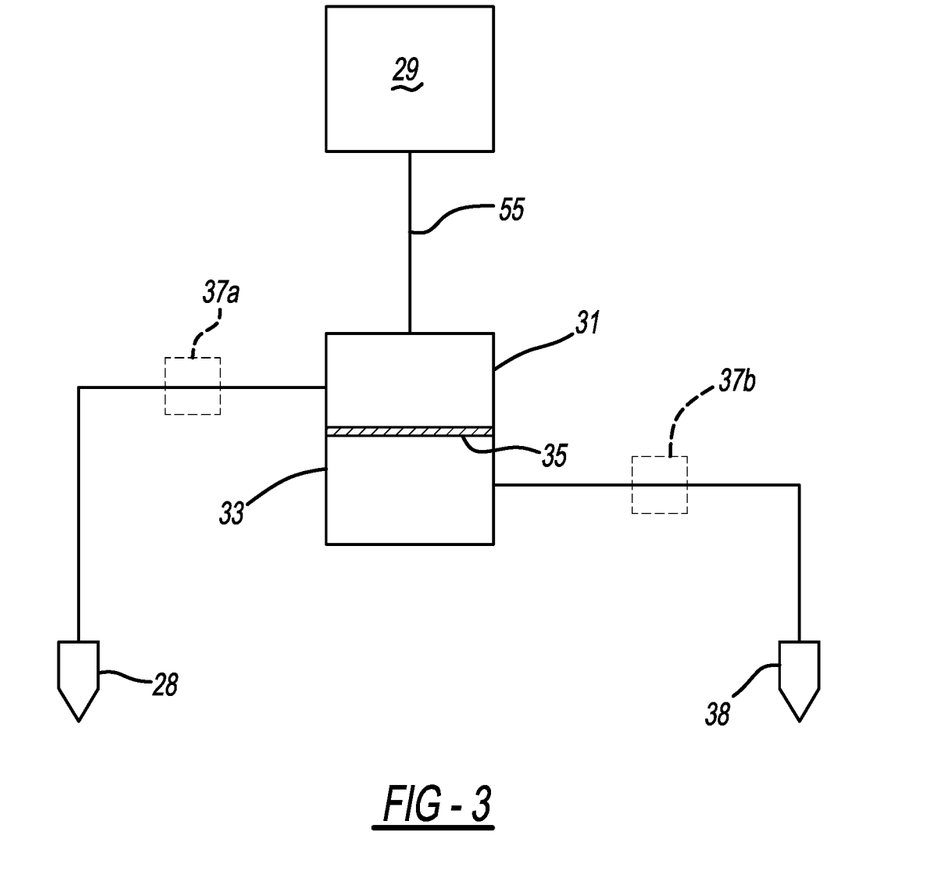
FIG. 3 is a schematic representation of an exhaust after-treatment system according to another exemplary embodiment of the present disclosure.

Now referring to FIG. 3, it can be seen that in lieu of sending a mixture of hydrogen and ammonia to each injector 28 and/or injector 38, exhaust treatment system 16 may include a gas separation device 31 downstream from electrochemical cell 29. Gas separation device 31 is configured to separate the mixture of gases produced by electrochemical cell 29 into hydrogen useful for purging or regenerating LNT 22, and ammonia useful for assisting in the selective catalytic reduction of NOx at SCR 24.

Gas separation device 31 may include a canister 33 having a separation membrane or filter 35 located therein. Separation membrane or filter 35 may be selected to separate hydrogen from the mixture of gases, or may be selected to separate ammonia from the mixture of gases produced by electrochemical cell 29. In this regard, in addition to hydrogen and ammonia, electrochemical cell 29 may also produce gases such as $CO_2$ and $N_2$. Regardless what type of membrane or filter 35 is selected for gas separation device 31, the separated hydrogen may be provided to injector 28 immediately after separation of the mixture of gases, or be provided to an accumulator 37a for storage. Similarly, the separated ammonia may be provided to injector 38 immediately after separation of the mixture of gases, or be provided to another accumulator 37b for storage. The stored hydrogen and ammonia may then be used, when desired.

Figure 4:
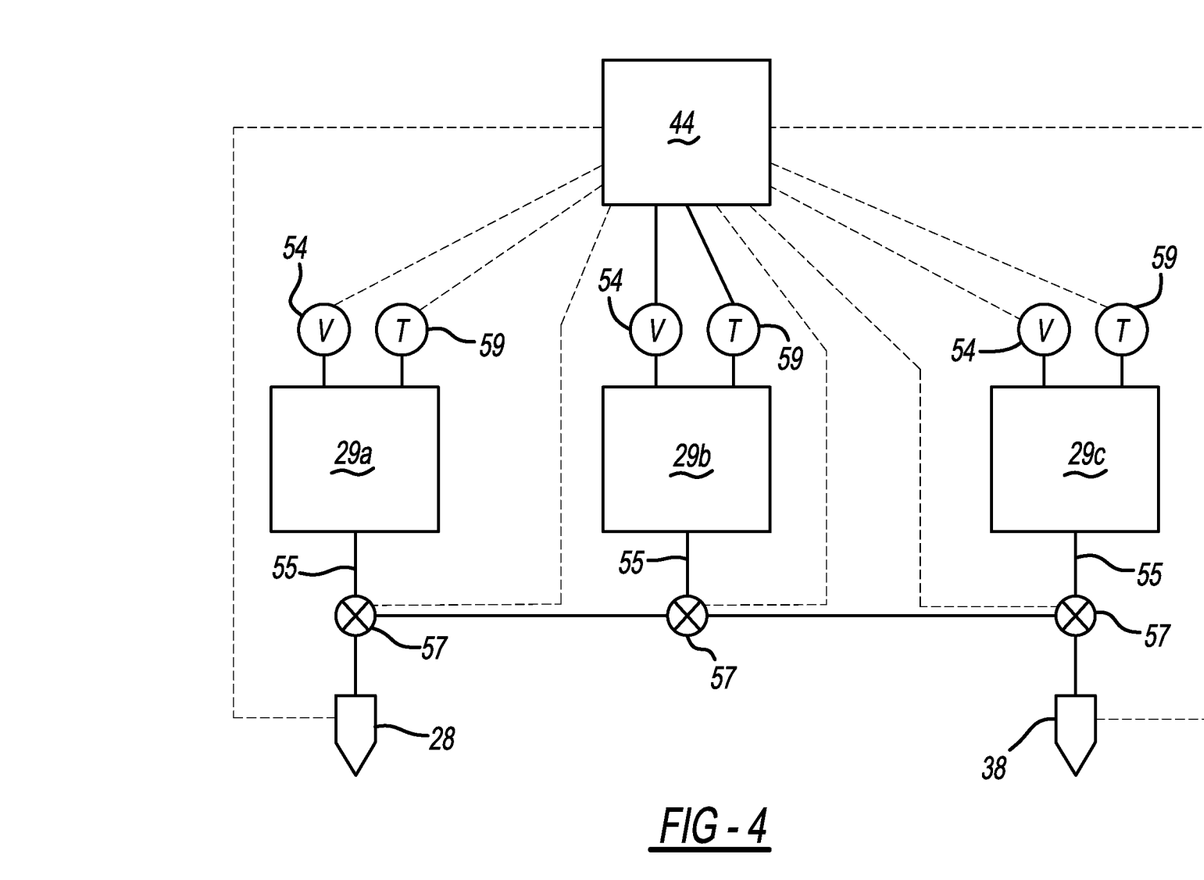
FIG. 4 is a schematic representation of an exhaust after-treatment system according to another exemplary embodiment of the present disclosure.

Now referring to FIG. 4, it can be seen that exhaust after-treatment system 16 may include a plurality of electrochemical cells 29, with each of the voltage sources 54 associated with each cell 29 being in communication with controller 44. Alternatively, each voltage source 54 can additionally be in communication with ECU 42 or only in communication with ECU 42. It should be understood that although three electrochemical cells 29a, 29b, and 29c are illustrated, a greater or lesser number of cells 29 can be utilized without departing from the scope of the present disclosure.

Each voltage source 54 is independently in communication with controller 44 or ECU 42 and, therefore, each electrochemical cell 29 can be separately controlled. Thus, the amounts of ammonia and hydrogen produced by each cell 29 can be independently adjusted to produce a plurality of different blends of ammonia and hydrogen for exhaust after-treatment and engine combustion. For example, all the cells 29a-29c can be directed by controller 44 or ECU 42 to produce only or more ammonia in comparison to hydrogen, or all the cells 29a-29c can be directed by controller 44 or ECU 42 to produce only or more hydrogen in comparison to ammonia. Alternatively, some of the cells 29 (e.g., 29a and 29b) can be used to produce or increase ammonia production, and one of the cells 29 (e.g., 29c) can be used to produce or increase hydrogen production. Still alternatively, a single cell (e.g., 29a) can be used for ammonia production and the remaining cells (e.g., 29b and 29c) can be used for hydrogen production or vice versa. In other embodiments, a number (e.g., 1, 2, or 3) of the cells (e.g., 29a) can be used to produce hydrogen for engine combustion, while another number (e.g., 1 or 2) of the cells can be used for exhaust after-treatment. Further, any number of the cells 29a to 29c can be deactivated as needed. Any number of different combinations of using the cells 29a to 29c is contemplated for ammonia and hydrogen production.

Each cell 29a, 29b, and 29c includes an outlet 55 that may be opened and closed by a valve 57, with valves 57 each being in communication with controller 44 or ECU 42. With this configuration, valves 57 can be controlled to direct the mixture of gases produced by cells 29a, 29b, and 29c to either injector 28 or to injector 38. Alternatively, valves 57 can be used to split a portion of the gas mixture towards injector 28, and split a portion of the gas mixture towards injector 38. Regardless, as noted above, electrochemical cells 29a, 29b, and 29c can each be operated in a manner where various blends of hydrogen and ammonia can be produced. Based on the desired operating conditions of exhaust system 16, the use of valves 57 allow for various blends of the gas mixture to be directed to the desired injector(s) 28 and/or 38 as needed or desired.

FIG. 4 also illustrates the use of temperature control devices 59 that are associated with each electrochemical cell 29a, 29b, and 29c. Temperature control devices 59 may be used to either heat or cool electrochemical cells 29a, 29b, and 29c to further tailor the amounts of hydrogen and ammonia produced by each cell. That is, the use of temperature can also influence the reaction characteristics at anode 48 and cathode 50 to an extent that affects the production of hydrogen and ammonia. Because each temperature control device 59 is in communication with controller 44 or ECU 42, each cell 29a, 29b, and 29c can be independently adjusted to influence the blend of gases produced by each cell.

Figure 5:
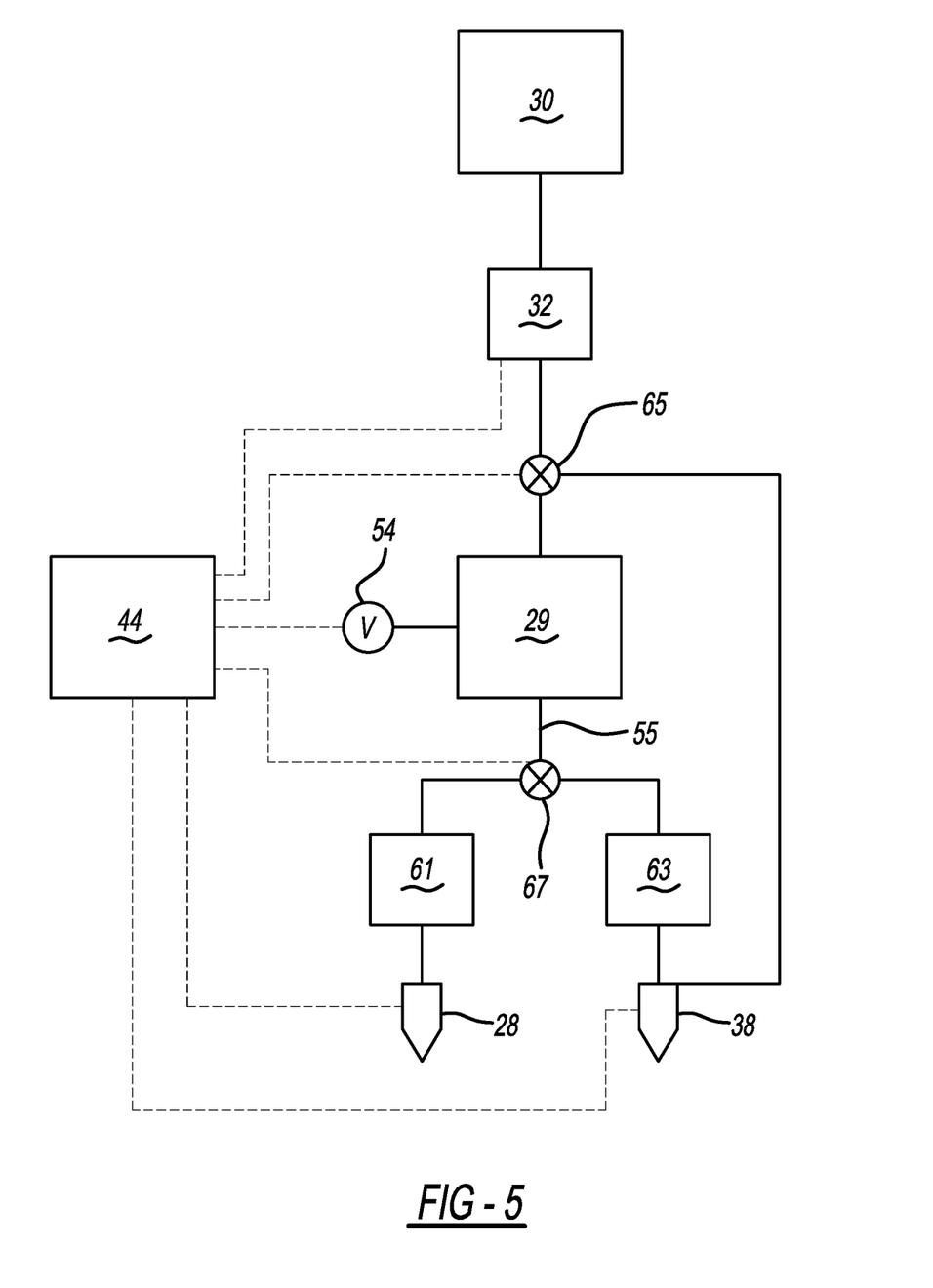
FIG. 5 is a schematic representation of an exhaust after-treatment system according to another exemplary embodiment of the present disclosure.

Now referring to FIG. 5, it can be seen that an electrochemical cell 29 is in communication with a hydrogen gas accumulator 61 and an ammonia gas accumulator 63. Although only a single electrochemical cell 29 is illustrated in FIG. 5, it should be understood that a plurality of electrochemical cells (e.g., the electrochemical cells 29a, 29b, and 29c illustrated in FIG. 4) can be used without departing from the scope of the present disclosure. According to the configuration illustrated in FIG. 5, aqueous urea reagent is fed from tank 30 by pump 32 to electrochemical cell(s) 29 after passing through bypass valve 65. Alternatively, bypass valve 65, which is controlled by controller 44 or ECU 42, may direct the aqueous urea reagent directly to injector 38 through bypass line 39. Although only FIG. 5 illustrates the use of bypass valve 65, it should be understood that any of the configurations illustrated in FIGS. 1-8 can include a bypass valve 67 and bypass line 39 to provide the aqueous urea reagent directly to injector 38.

After receipt of the aqueous urea reagent by electrochemical cell(s) 29, the production of ammonia or hydrogen is conducted as described above. More specifically, electrochemical cell(s) 29 are directed to produce either ammonia or hydrogen by controlling voltage source 54 with controller 44 or ECU 42. The ammonia or hydrogen produced by electrochemical cell(s) 29 then exits electrochemical cell(s) through outlet 55 where valve 67 is placed to direct the gases to the desired accumulator 61 or 63. That is, if hydrogen gas is produced by electrochemical cell(s) 29, the valve 67 directs the hydrogen gas to the hydrogen gas accumulator 61. If ammonia gas is produced by electrochemical cell(s) 29, the valve 67 directs the ammonia gas to ammonia gas accumulator 63. The accumulators 61 and 63 may then store the hydrogen and ammonia gases, respectively, until needed by exhaust system 16. When the gases are needed by the exhaust system 16, accumulators 61 and 63 may then feed injectors 28 and 38 for dosing into the exhaust stream. To control feeding of the gases to injectors 28 and 38, accumulators 61 and 63 may include mechanical or electromechanical outlets (not shown) that are controlled by controller 44 or ECU 42.

Figure 6:
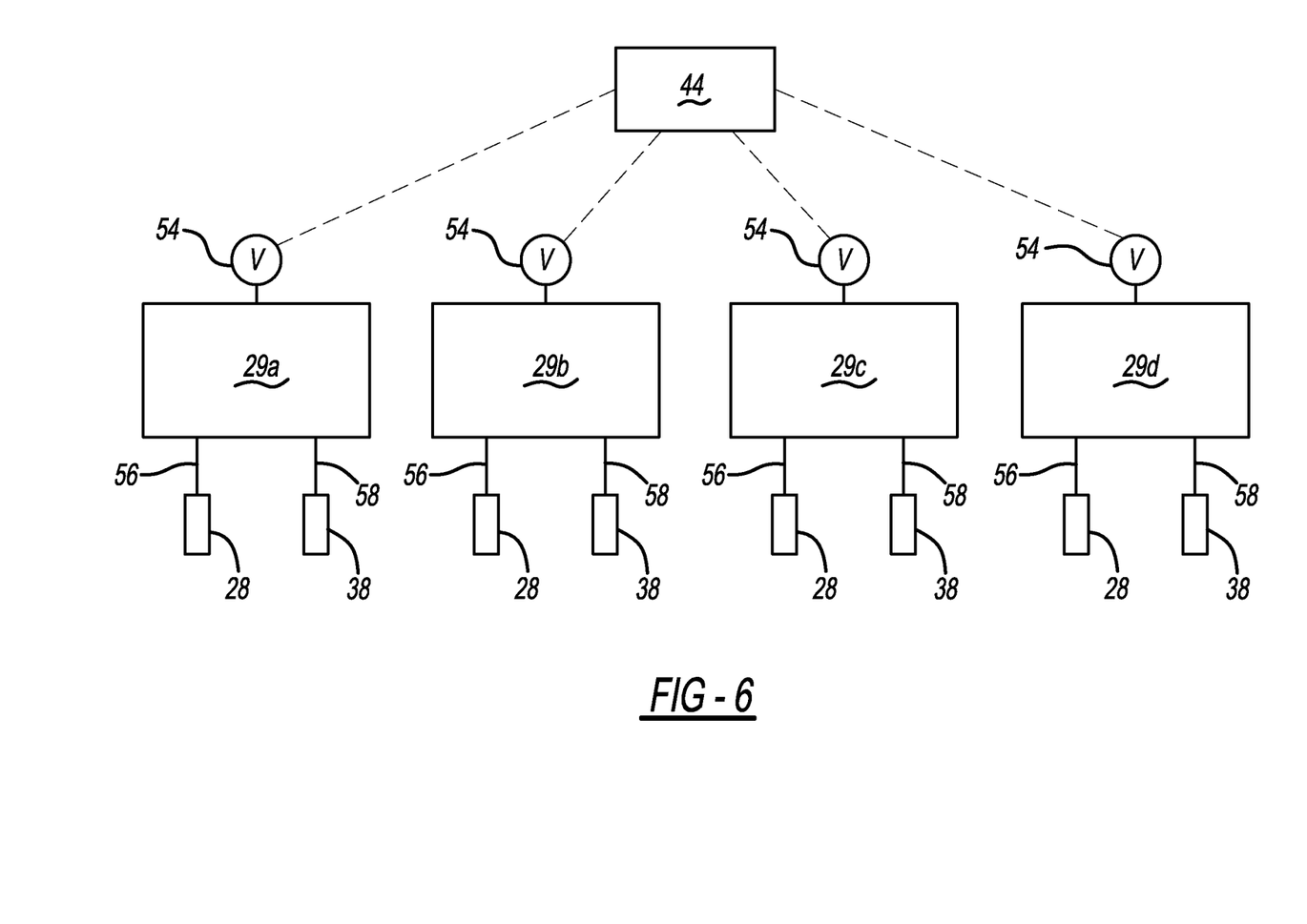
FIG. 6 is a schematic representation of an exhaust after-treatment system according to another exemplary embodiment of the present disclosure.

Now referring to FIG. 6, it can be seen that exhaust after-treatment system 16 may include a plurality of electrochemical cells 29, with each of the voltage sources 54 associated with each cell 29 being in communication with controller 44. Alternatively, each voltage source 54 can additionally be in communication with ECU 42 or only in communication with ECU 42. It should be understood that although four electrochemical cells 29a, 29b, 29c, and 29d are illustrated, a greater or lesser number of cells 29 can be utilized without departing from the scope of the present disclosure.

Each voltage source 54 is independently in communication with controller 44 or ECU 42 and, therefore, each electrochemical cell 29 can be separately controlled. Thus, the amounts of ammonia and hydrogen produced by each cell can be independently adjusted to produce a plurality of different blends of ammonia and hydrogen for exhaust after-treatment and engine combustion. For example, all the cells 29a-29d can be directed by controller 44 or ECU 42 to produce only or more ammonia in comparison to hydrogen, or all the cells 29a-29d can be directed by controller 44 or ECU 42 to produce only or more hydrogen in comparison to ammonia. Alternatively, half of the cells 29 (e.g., 29a and 29b) can be used for or to produce or increase ammonia production, and half of the cells 29 (e.g., 29c and 29d) can be used to produce or increase hydrogen production. Still alternatively, a single cell (e.g., 29a) can be used for ammonia production and the remaining cells (e.g., 29b-29d) can be used for hydrogen production or vice versa. In other embodiments, a number (e.g., 1, 2, or 3) of the cells (e.g., 29a) can be used to produce hydrogen for engine combustion, while another number (e.g., 1, 2, or 3) of the cells can be used for exhaust after-treatment. Further, any number of the cells 29a to 29d can be deactivated as needed. Any number of different combinations of using the cells 29a to 29d is contemplated for ammonia and hydrogen production.

Figure 7:
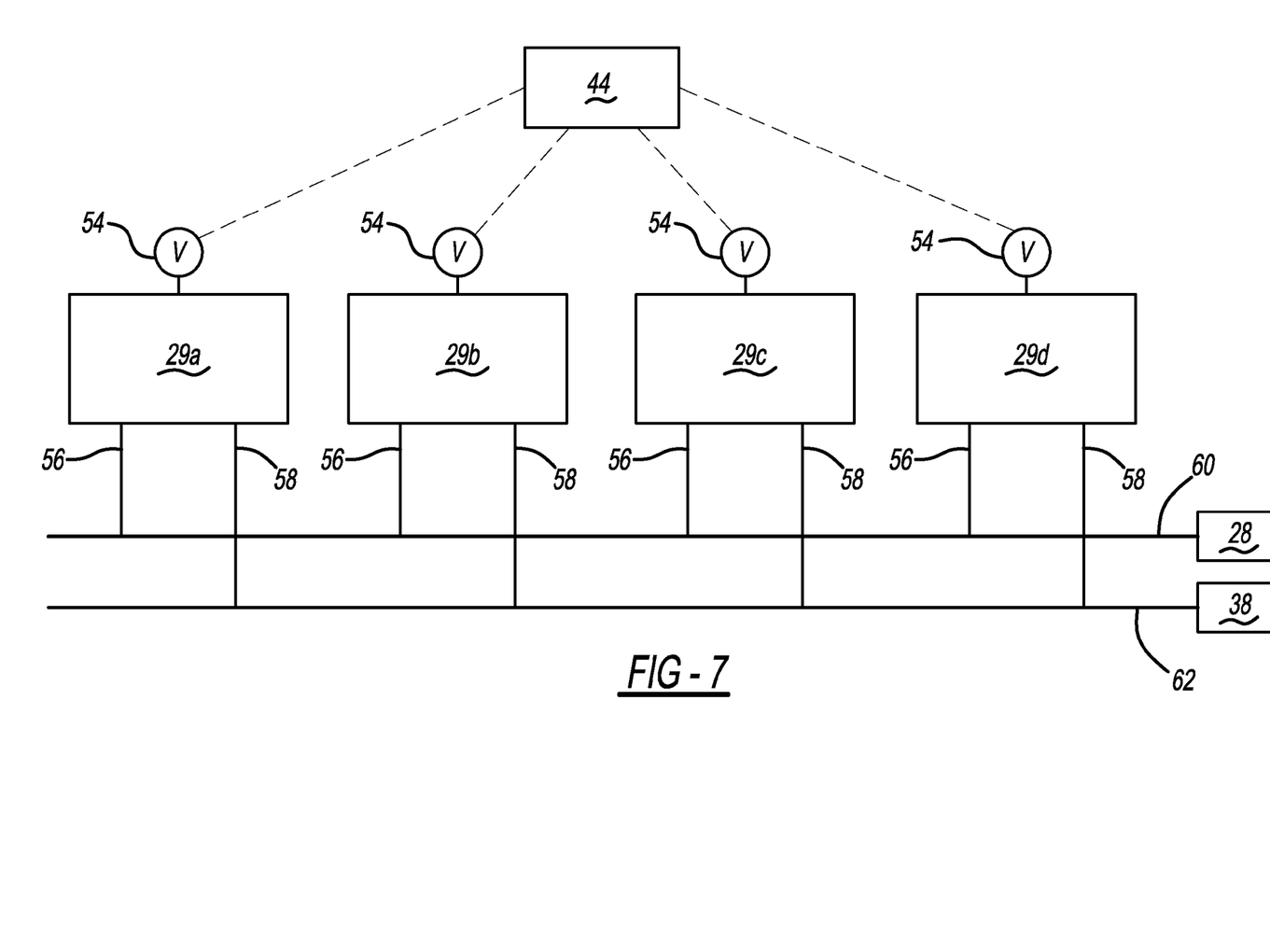
FIG. 7 is a schematic representation of an exhaust after-treatment system according to another exemplary embodiment of the present disclosure.
Figure 8:
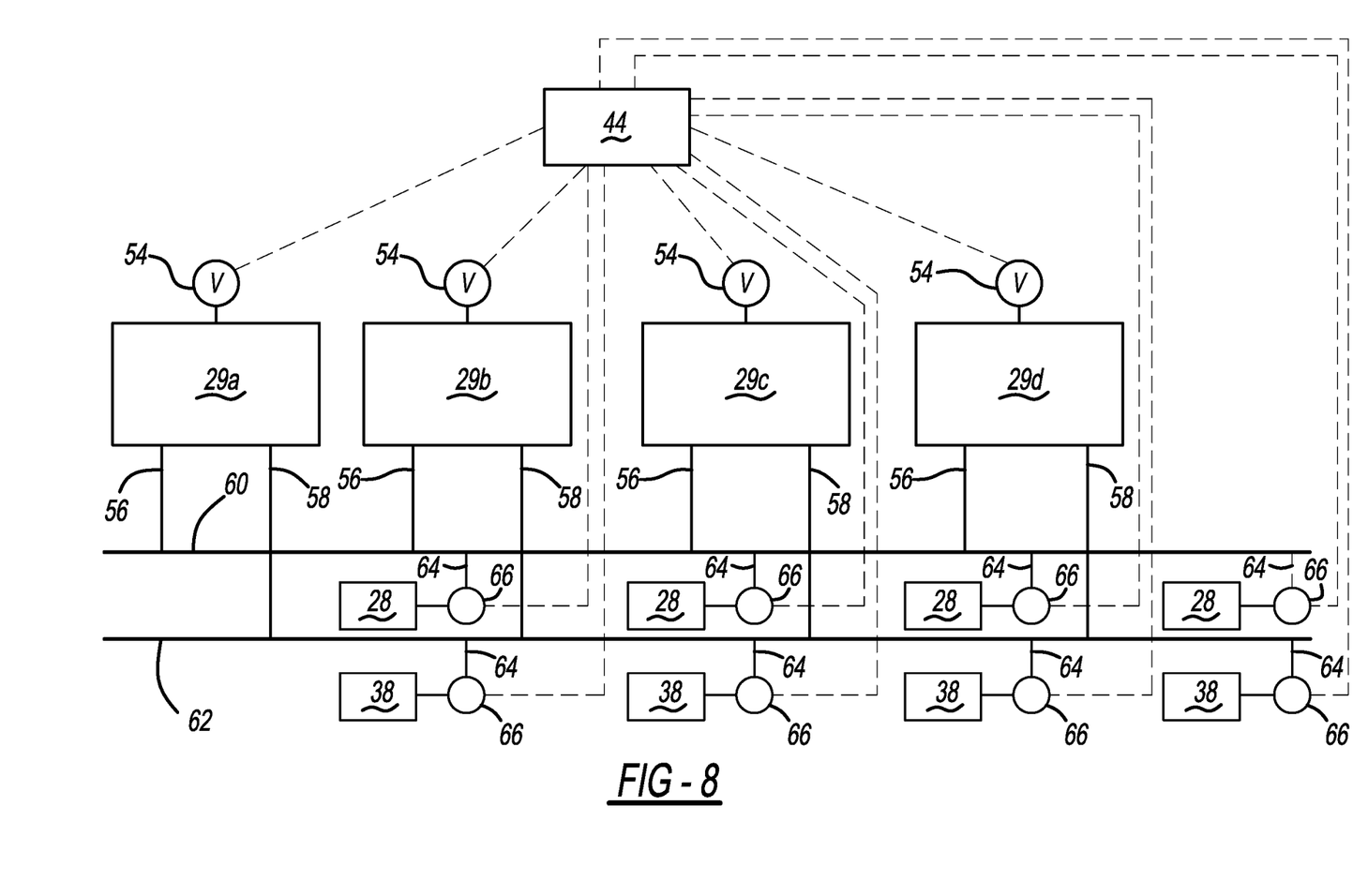
FIG. 8 is a schematic representation of an exhaust after-treatment system according to another exemplary embodiment of the present disclosure.

Although the cells 29a to 29d in FIG. 6 are illustrated as being separate and apart from each other and in communication with their own corresponding injectors 28 and 38 via outlets 56 and 58, respectively, the present disclosure should not be limited thereto. For example, as illustrated in FIG. 7, the outlet lines 56 and 58 for ammonia and hydrogen, respectively, may feed into feed lines 60 and 62 that are common to each cell 29. Feed lines 60 and 62 may then be in communication with a single injector 28 or 38, or in communication with a plurality of injectors 28 or 38 through the use of additional lines 64 and valves 66 (FIG. 8), with the valves 66 being in communication with controller 44 or ECU 42 so that the desired location of the ammonia or hydrogen can be controlled by opening and closing the various valves 66. Alternatively, the cells 29a to 29d can be in a stacked arrangement as illustrated in FIG. 6.

As noted above, the adjustment of voltage to each of the anode 48 and cathode 50 can be used to tailor the amounts of ammonia and hydrogen produced by each cell 29. Similarly, the adjustment of current applied to the anode 48 and cathode 50 can also be used to affect performance of the cell 29. Assuming that the voltage applied to each of the anode 48 and cathode 50 is constant, the current applied to anode 48 and cathode 50 can be varied by adjusting the resistance of the cell 29. More particularly, the current can be adjusted by either raising or lowering the resistance of the cell 29. To adjust the resistance of the cell 29, the concentration of the aqueous urea reagent can be changed by either increasing or decreasing the amount of aqueous urea reagent provided to cell 29. This can be done by either increasing or decreasing the flow rate of the aqueous urea reagent into the cell 29 by adjusting operation of pump 32. Alternatively, increasing or decreasing the concentration of the electrolyte 52 can affect the resistance of the cell 29. In this regard, although not illustrated in the drawings, it should be understood that the alkaline electrolyte 52 can be continually recycled using a tank (not shown) and inlets and outlets that allow the electrolyte 52 to be recharged. Similar to the aqueous urea reagent, the flow rate of the alkaline electrolyte 52 to cell can be adjusted to affect the concentration thereof.

In addition, if the anode 48 is formed of nickel, it is believed that the formation of nickel oxyhydroxide (NiOOH) at the surface of anode 48 assists in catalyzing the formation of ammonia from the aqueous urea reagent. The formation of nickel oxyhydroxide can either be increased or decreased by adjusting the current applied to the anode 48. Accordingly, to increase the amount of ammonia produced by cell 29, the current applied to anode 48 can be increased by increase the formation the nickel oxyhydroxide and, therefore, increase the rate of production of ammonia. Alternatively, if a lower production of ammonia is desired, the formation of nickel oxyhydroxide can be reduced by lowering the current applied to anode 48. Regardless, it should be understood that various blends of ammonia and hydrogen can be produced by each cell 29 by adjusting the current applied to the anode 48 and cathode 50. Although the resistance of the cell 29 can be affected by adjusting either the aqueous urea concentration or the electrolyte 52 concentration, it should be understood that the resistance can be altered in other ways as well. For example, the addition of a salt, acid or base can also be used to modify the resistance of the cell.

The electrical current may also be used to control the production of ammonia from the electrolytic hydrolysis of urea and therefore control the rate of injecting ammonia into an exhaust gas treatment system. For example, a given electrical current may be required to induce the active form of the active metal in all the regions of the anode to maximize the production of ammonia. The applied current may be lowered when the need for ammonia decreases.

It should also be understood that the cell 29 may operate over varying ranges of pressure and temperature. Preferably, the pressure may be about atmospheric or ambient pressure. With respect to temperature, a preferably temperature range for operating the cell 29 may range between about 0 C to about 100 C. Temperatures above 100 C are generally not desirable from the standpoint of prevent unwanted co-reactions from taking place within the cell. Exemplary unwanted co-reactions include the aqueous urea solution undergoing thermolysis reactions that can produce unwanted byproducts such as biuret, cyanuric acid, ammelide, ammeline, and melamine. Regardless, it should be understood that the temperature of cell 29 may be controlled with any available source. For example, the electrolytic cell 29 may include a heater apparatus such as a heating jacket that surrounds the chamber 46, from which heat may be supplied by providing exhaust gases to the jacket. Alternatively, an electric heater may be provided to the cell 29.

Lastly, it should be understood that exhaust treatment system 16 may be configured to include only LNT 22 in lieu of the LNT 22 and SCR 24 illustrated in FIG. 1. If such a configuration is selected, it should be understood that reagent tank 30 may be configured to hold water instead of the aqueous urea reagent. The water in tank 30 may then undergo electrolysis in electrochemical cell 29 to produce hydrogen gas that is fed dynamically as required to injector 28 for purging or regenerating LNT 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust after-treatment system comprising:
an exhaust passage;
a lean-NOx trap (LNT) provided in the exhaust passage;
an exhaust treatment component provided in the exhaust passage;
a tank carrying an aqueous reagent;
an electrochemical cell in communication with the tank and configured to receive the aqueous reagent therefrom, the electrochemical cell configured to convert the aqueous reagent into a hydrogen exhaust treatment fluid for purging the LNT and another exhaust treatment fluid for treating an exhaust in the exhaust treatment component; and
a controller in communication with the electrochemical cell, the controller being configured to vary an amount of the hydrogen exhaust treatment fluid produced by the electrochemical cell.

2. The exhaust after-treatment system according to claim 1, further comprising an injector in communication with the electrochemical cell and the exhaust passage, the injector being configured to receive the hydrogen exhaust treatment fluid from the electrochemical cell, and dose the hydrogen exhaust treatment fluid into the exhaust passage at a location upstream from the LNT.

3. The exhaust after-treatment system according to claim 2, wherein the aqueous reagent comprises urea.

4. The exhaust after-treatment system according to claim 3, wherein the another exhaust treatment fluid includes an ammonia exhaust treatment fluid, and the injector is configured to receive the hydrogen and ammonia exhaust treatment fluids from the electrochemical cell, and dose the hydrogen and ammonia exhaust treatment fluids into the exhaust passage at a location upstream from the LNT.

5. The exhaust after-treatment system according to claim 4, wherein the exhaust treatment component includes an SCR exhaust treatment component that is located in the exhaust passage downstream from the LNT; and
the exhaust after-treatment system further comprises a second injector in communication with the electrochemical cell and the exhaust passage, the second injector being configured to receive the ammonia exhaust treatment fluid from the electrochemical cell and/or the aqueous reagent from the tank, and dose the ammonia exhaust treatment fluid and/or the aqueous reagent into the exhaust passage at a location upstream from the SCR exhaust treatment component.

6. The exhaust after-treatment system according to claim 1, wherein the electrochemical cell includes an anode and a cathode, each of the anode and the cathode being in communication with a power source.

7. The exhaust after-treatment system according to claim 6, wherein the power source is in communication with the controller.

8. The exhaust after-treatment system according to claim 7, wherein power source is configured to apply a voltage to each of the anode and the cathode based on an instruction received from the controller.

9. The exhaust after-treatment system according to claim 1, further comprising a plurality of the electrochemical cells.

10. The exhaust after-treatment system according to claim 4, further comprising a first accumulator and a second accumulator in communication with the electrochemical cell, the first accumulator configured to store the hydrogen exhaust treatment fluid produced by the electrochemical cell, and the second accumulator configured to store the ammonia exhaust treatment fluid.

11. An exhaust after-treatment system comprising:
an exhaust passage;
a lean-NOx trap (LNT) provided in the exhaust passage;
an SCR exhaust treatment component provided in the exhaust passage;
a tank carrying an aqueous urea reagent;

a plurality of electrochemical cells in communication with the tank and configured to receive the aqueous urea reagent therefrom, the electrochemical cells each configured to convert the aqueous reagent into ammonia exhaust treatment fluid and a hydrogen exhaust treatment fluid;

a controller in communication with each of the electrochemical cells, the controller being configured to vary amounts of each of the hydrogen exhaust treatment fluid and the ammonia exhaust treatment fluid produced by the electrochemical cells;

a first injector in communication with each of the electrochemical cells and the exhaust passage, the first injector being configured to receive the hydrogen exhaust treatment fluid from the electrochemical cells, and dose the hydrogen exhaust treatment fluid into the exhaust passage at a location upstream from the LNT to purge the LNT; and a second injector in communication with each of the electrochemical cells and the exhaust passage, the second injector being configured to receive the ammonia exhaust treatment fluid from the electrochemical cells, and dose the ammonia exhaust treatment fluid into the exhaust passage at a location upstream from the SCR exhaust treatment component.

12. The exhaust after-treatment system according to claim 11, wherein the electrochemical cells each include an anode, a cathode, and a power source, each of the anode and the cathode being in communication with the power source.

13. The exhaust after-treatment system according to claim 12, wherein each of the power sources are in communication with the controller.

14. The exhaust after-treatment system according to claim 13, wherein the power source of each cell is configured to apply a voltage to each of the anode and the cathode of each cell based on an instruction received from the controller.

15. The exhaust after-treatment system according to claim 14, wherein the voltage applied to the anode and cathode of each cell is independently selected by the controller to vary the amounts of each of the ammonia exhaust treatment fluid and the hydrogen exhaust treatment fluid produced by each of the electrochemical cells.

16. The exhaust after-treatment system according to claim 11, further comprising a pump between the tank and each of the electrochemical cells for providing the aqueous urea reagent from the tank to the each of the electrochemical cells, the pumps each being in communication with the controller.

17. The exhaust after-treatment system according to claim 16, wherein a flow rate of the aqueous urea reagent to each of the electrochemical cells provided by each of the pumps is independently selected by the controller to vary a concentration of the aqueous reagent in each of the electrochemical cell.

18. The exhaust after-treatment system according to claim 17, wherein varying the concentration of the aqueous urea reagent in each of the electrochemical cells varies a current applied to the anode and the cathode of each of the electrochemical cells to vary the amounts of each of the ammonia exhaust treatment fluid and the hydrogen exhaust treatment fluid produced by each of the electrochemical cells.

19. The exhaust after-treatment system according to claim 11, wherein each of the electrochemical cells are in communication with a first feed line that is configured to provide the hydrogen exhaust treatment fluid produced by each of the electrochemical cells to the first injector, and each of the electrochemical cells are in communication with a second feed line that is configured to provide the ammonia exhaust treatment fluid produced by each of the electrochemical cells to the second injector.

20. An exhaust after-treatment system comprising:

an exhaust passage;

a lean-NOx trap (LNT) provided in the exhaust passage;

an SCR exhaust treatment component provided in the exhaust passage;

a tank carrying an aqueous urea reagent;

a plurality of electrochemical cells in communication with the tank and configured to receive the aqueous urea reagent therefrom, the electrochemical cells each configured to convert the aqueous reagent into a hydrogen exhaust treatment fluid and an ammonia exhaust treatment fluid;

a controller in communication with each of the electrochemical cells, the controller being configured to vary amounts of each of the hydrogen exhaust treatment fluid and the ammonia exhaust treatment fluid produced by the electrochemical cells;

a first feed line in communication with and configured to receive the hydrogen exhaust treatment fluid from each of the electrochemical cells;

a second feed line in communication with and configured to receive the ammonia exhaust treatment fluid from each of the electrochemical cells;

a plurality of first injectors in communication with the first feed line, the first injectors each being configured to dose the hydrogen exhaust treatment fluid into the exhaust passage at a location upstream from the LNT; and a plurality of second injectors in communication with the second feed line, the second injectors each being configured to dose the ammonia exhaust treatment fluid into the exhaust passage at a location upstream from the SCR exhaust treatment component, wherein a plurality of first valves are located between the first injectors and the first feed line, and a plurality of second valves are located between the second injectors and the second feed line.

21. The exhaust after-treatment system according to claim 20, wherein each of the first valves and each of the second valves are in communication with the controller.

22. The exhaust after-treatment system according to claim 21, wherein each of the first valves and each of the second valves are independently actuated by the controller to vary amounts of the ammonia exhaust treatment fluid and hydrogen exhaust treatment fluid doses into the exhaust passage.

23. The exhaust after-treatment system according to claim 20, wherein the electrochemical cells each include an anode, a cathode, and a power source, each of the anode and the cathode being in communication with the power source.

24. The exhaust after-treatment system according to claim 23, wherein each of the power sources are in communication with the controller.

25. The exhaust after-treatment system according to claim 24, wherein the power source of each cell is configured to apply a voltage to each of the anode and the cathode of each cell based on an instruction received from the controller.

26. The exhaust after-treatment system according to claim 23, wherein the voltage applied to the anode and cathode of each cell is independently selected by the controller to vary the amounts of each of the hydrogen exhaust treatment fluid and the ammonia exhaust treatment fluid produced by each of the electrochemical cells.

27. The exhaust after-treatment system according to claim 20, further comprising a pump between the tank and each of the electrochemical cells for providing the aqueous urea reagent from the tank to the each of the electrochemical cells, the pumps each being in communication with the controller.

28. The exhaust after-treatment system according to claim 27, wherein a flow rate of the aqueous urea reagent to each of the electrochemical cells provided by each of the pumps is independently selected by the controller to vary a concentration of the aqueous reagent in each of the electrochemical cell.

29. The exhaust after-treatment system according to claim 28, wherein varying the concentration of the aqueous urea reagent in each of the electrochemical cells varies a current applied to the anode and the cathode of each of the electrochemical cells to vary the amounts of each of the hydrogen exhaust treatment fluid and the ammonia exhaust treatment fluid produced by each of the electrochemical cells.

* * * * *